(12) United States Patent
Goyal et al.

(10) Patent No.: US 10,339,900 B2
(45) Date of Patent: Jul. 2, 2019

(54) REMEDIATING INTERFERENCE OF AN INSTANCE OF A VISUAL NOTIFICATION WITH AN OUTPUT OF AN APPLICATION ON A DISPLAY DEVICE

(71) Applicant: International Business Machines Corporation, Armonk, NY (US)

(72) Inventors: Munish Goyal, Yorktown Heights, NY (US); Wing L. Leung, Austin, TX (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/397,777

(22) Filed: Jan. 4, 2017

(65) Prior Publication Data

US 2018/0190243 A1    Jul. 5, 2018

(51) Int. Cl.
*G06F 3/01* (2006.01)
*G09G 5/00* (2006.01)
*G06F 3/147* (2006.01)
*G09G 5/377* (2006.01)

(52) U.S. Cl.
CPC ............ *G09G 5/377* (2013.01); *G06F 3/013* (2013.01); *G06F 3/147* (2013.01); *G09G 5/003* (2013.01); *G09G 2320/0261* (2013.01); *G09G 2330/12* (2013.01); *G09G 2340/12* (2013.01); *G09G 2340/14* (2013.01); *G09G 2354/00* (2013.01); *G09G 2380/06* (2013.01)

(58) Field of Classification Search
CPC .................... G09G 5/003; G06Q 30/0242
See application file for complete search history.

(56) References Cited

U.S. PATENT DOCUMENTS

| | | | |
|---|---|---|---|
| 6,459,440 B1 | 10/2002 | Monnes et al. | |
| 6,538,660 B1 * | 3/2003 | Celi, Jr. ................. | G09G 5/14 345/592 |
| 8,312,539 B1 | 11/2012 | Nachenberg et al. | |
| 9,189,064 B2 | 11/2015 | Chaudhri et al. | |
| 2002/0057285 A1 * | 5/2002 | Nicholas, III ...... | G06F 3/04812 715/700 |

(Continued)

*Primary Examiner* — Jeffery A Brier
(74) *Attorney, Agent, or Firm* — Nicholas D. Bowman; Maxine L. Barasch; Keohane & D'Alessandro PLLC

(57) ABSTRACT

Methods, systems, and computer program products are provided for remediating an instance of a visual notification interfering with an output of an application on a display device of an electronic device. An instance of a visual notification is identified on a display device. The visual notification is determined to be interfering with the output of the application on the display device. User response to the output of the application is monitored. An assessment is made, based on the monitoring, of an effectiveness of the output of the application. It is determined, based on the assessment, that there exists a failure of the effectiveness of the output of the application. A remediation action is performed in response to the determined failure. The remediation action may include removal of the instance of the visual notification, terminating a parent process of the instance of the visual notification, or restarting the electronic device.

15 Claims, 4 Drawing Sheets

(56) References Cited

U.S. PATENT DOCUMENTS

| | | | |
|---|---|---|---|
| 2004/0139184 A1* | 7/2004 | Bantz | G06F 9/4446 709/223 |
| 2011/0055135 A1* | 3/2011 | Dawson | G06Q 30/02 706/47 |
| 2016/0191429 A1* | 6/2016 | Lee | G06F 3/04817 715/752 |
| 2016/0292713 A1* | 10/2016 | Chen | G06Q 30/0242 |

* cited by examiner

REMEDIATING INTERFERENCE OF AN INSTANCE OF A VISUAL NOTIFICATION WITH AN OUTPUT OF AN APPLICATION ON A DISPLAY DEVICE

FIELD OF THE INVENTION

The present invention relates generally to visual computing displays, and, more particularly, to remediating interference of an instance of a visual notification with an output of an application on a display device.

BACKGROUND

Display screens are used in many environments today, including for posting of flight statuses at airports, train statuses at rail stations, menus of fast food restaurants, etc. These "digital signage" screens may display important information to the viewer. An airport flight status screen, for example, is where viewers can get information, via output of an application, about whether their flight is on time or there has been a gate change. Without this information readily available, people could miss their flights. Sometimes, there is a problem with the electronic device that controls output to the screen. This may cause the electronic device to display an error, warning, or other message over the output, blocking view of the output, for example, flight statuses. There exists a need to improve output display.

SUMMARY

Methods, systems, and computer program products are provided for remediating an instance of a visual notification interfering with an output of an application on a display device of an electronic device. An instance of a visual notification is identified on a display device. The visual notification is determined to be interfering with the output of the application on the display device. User response to the output of the application is monitored. An assessment is made, based on the monitoring, of an effectiveness of the output of the application. It is determined, based on the assessment, that there exists a failure of the effectiveness of the output of the application. A remediation action is performed in response to the determined failure. The remediation action may include removal of the instance of the visual notification, terminating a parent process of the instance of the visual notification, or restarting the electronic device.

In one aspect, embodiments include a computer-implemented method for remediating an instance of a visual notification interfering with an output of an application on a display of an electronic device, comprising: identifying the instance of the visual notification on the display; determining that the visual notification is interfering with the output of the application on the display; performing a remediation action; monitoring user response to the output of the application; assessing, based on the monitoring, an effectiveness of the output of the application; determining, based on the assessing, a failure of the effectiveness of the output of the application; and performing a second remediation action in response to the determined failure of effectiveness of the output of the application.

In another aspect, embodiments include a computer system comprising: a processor; a memory coupled to the processor, the memory containing instructions, that when executed by the processor, perform the steps of: identifying an instance of a visual notification on a display of an electronic device; determining that the visual notification is interfering with an output of an application on the display; performing a remediation action; monitoring user response to the output of the application; assessing, based on the monitoring, an effectiveness of the output of the application; determining, based on the assessment, a failure of the effectiveness of the output of the application; and performing a second remediation action in response to the determined failure of effectiveness of the output of the application.

In yet another aspect, embodiments include a computer program product in a computing device comprising a computer readable storage medium having program instructions embodied therewith, the program instructions executable by a processor to cause the computing device to: identify an instance of a visual notification on a display device; determine that the visual notification is interfering with an output of an application on the display device; perform a remediation action; monitor user response to the output of the application; assess, based on the monitoring, an effectiveness of the output of the application; determine, based on the assessment, a failure of the effectiveness of the output of the application; and perform a second remediation action in response to the determined failure of effectiveness of the output of the application.

BRIEF DESCRIPTION OF THE DRAWINGS

Features of the disclosed embodiments will be more readily understood from the following detailed description of the various aspects of the invention taken in conjunction with the accompanying drawings.

Figure 1:
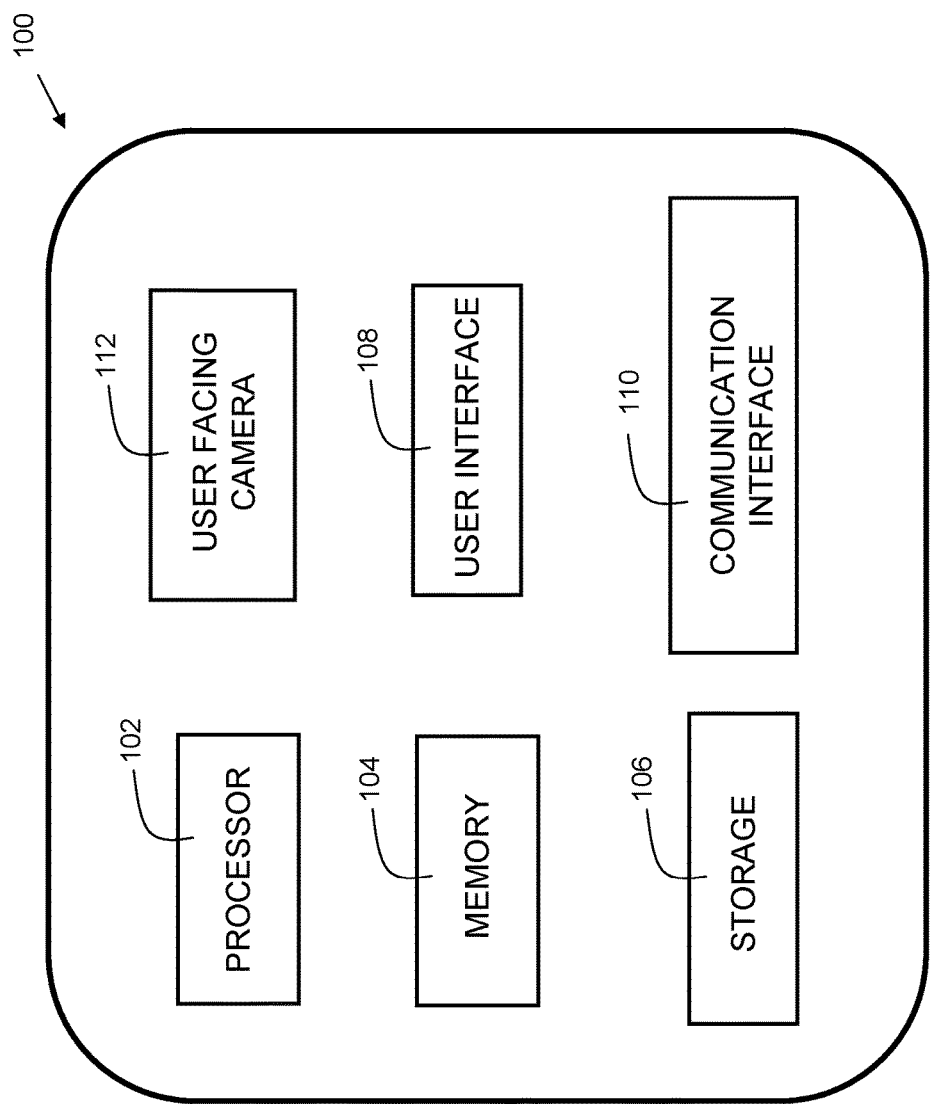
FIG. 1 is a device block diagram for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Methods, systems, and computer program products are provided for remediating an instance of a visual notification interfering with an output of an application on a display device of an electronic device. An instance of a visual notification is identified on a display device. The visual notification is determined to be interfering with the output of the application on the display device. User response to the output of the application is monitored. An assessment is made, based on the monitoring, of an effectiveness of the output of the application. It is determined, based on the assessment, that there exists a failure of the effectiveness of the output of the application. A remediation action is performed in response to the determined failure. The remediation action may include removal of the instance of the visual notification, terminating a parent process of the instance of the visual notification, or restarting the electronic device.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is a device block diagram for embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se.

Device 100 further includes storage 106. In embodiments, storage 106 may include one or more magnetic storage devices such as hard disk drives (HDDs). Storage 106 may additionally include one or more solid state drives (SSDs).

The memory 104 and storage 106 together provide memory for multiple applications to execute on processor 102. In embodiments, device 100 may have multiple processors 102, and/or multiple cores per processor. The device 100 may execute an operating system that provides virtual memory management for the device 100. The processor 102 may have one or more cache memories therein. Memory 104 stores instructions, which when executed by the processor, implement the steps of the present invention.

Device 100 further includes a user interface 108, examples of which include a liquid crystal display (LCD), a plasma display, a cathode ray tube (CRT) display, a light emitting diode (LED) display, an organic LED (OLED) display, or other suitable display technology. The user interface 108 may further include a keyboard, mouse, or other suitable human interface device. In some embodiments, user interface 108 may be a touch screen, incorporating a capacitive or resistive touch screen in some embodiments.

The device 100 further includes a communication interface 110. The communication interface 110 may be a wired communication interface that includes Ethernet, Gigabit Ethernet, or the like. In embodiments, the communication interface 110 may include a wireless communication interface that includes modulators, demodulators, and antennas for a variety of wireless protocols including, but not limited to, Bluetooth™, Wi-Fi, and/or cellular communication protocols for communication over a computer network.

The device 100 may further include a user facing camera 112. The user facing camera 112 is oriented such that it faces the user(s) as he/she/they views the user interface 108.

Figure 2:
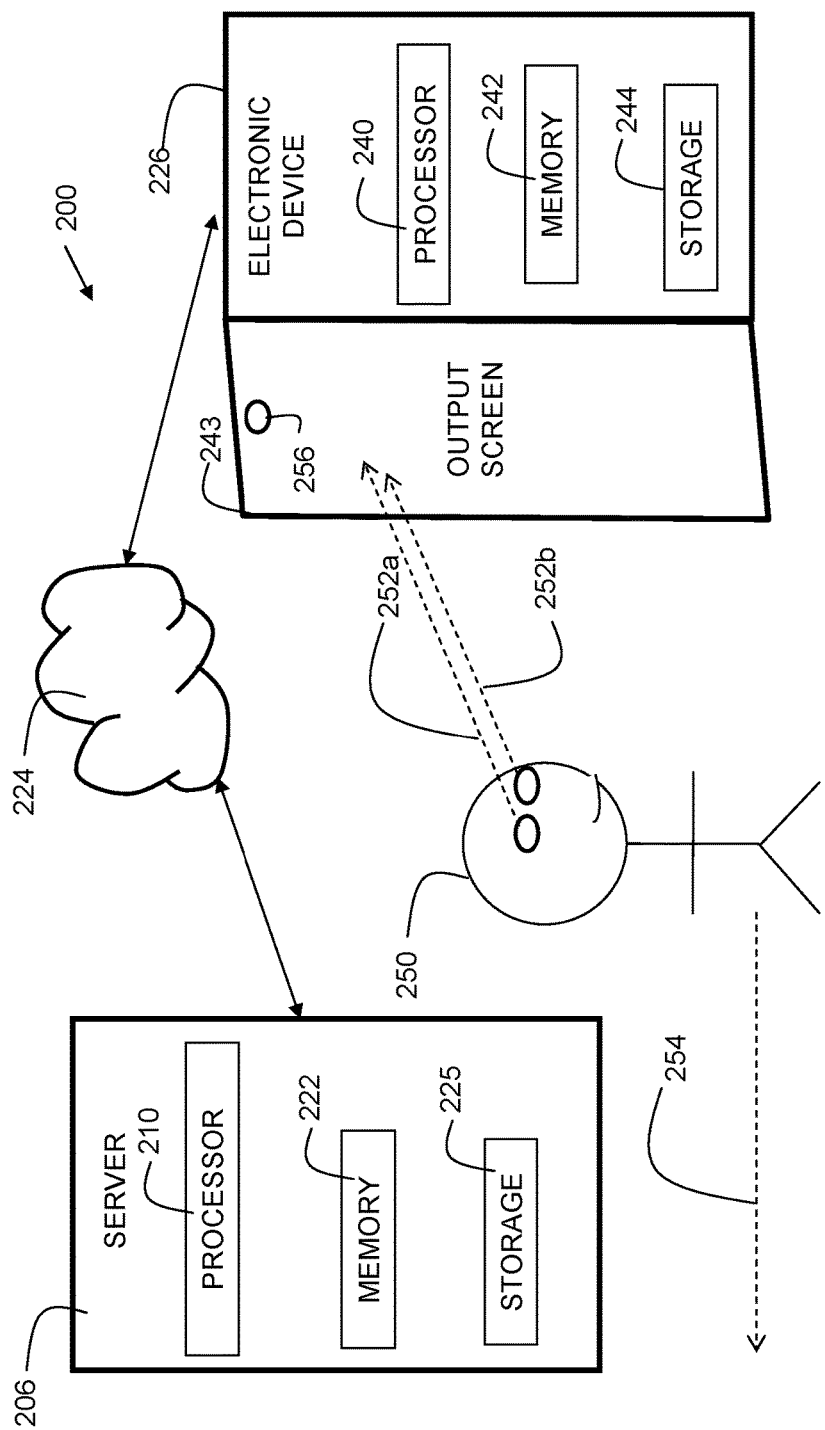
FIG. 2 is a system diagram in accordance with embodiments of the invention.

FIG. 2 is a system diagram 200 in accordance with embodiments of the present invention. Server 206 and electronic device 226 are in communication via network 224. In embodiments, server 206 provides data that is displayed by electronic device 226. Server 206 includes processor 210, memory 222, and storage 225. Electronic device 226 includes processor 240, memory 242, and storage 244. Memory 242 includes instructions, which when executed by the processor 240, execute steps in accordance with embodiments of the invention. It has an output screen 243 associated either as an integral unit to the electronic device 226 or in communication via wired or wireless (near field communication) with the electronic device 226. Camera 256 is positioned on or in proximity to the output screen so as to be able to monitor viewers' responses to the output screen 243. An image processing system, which may include face identification modules, may be stored within memory 242. This allows recognition of objects detected by camera 256 as human faces. Furthermore, the image processing system may identify facial features including eyes, and identify the direction of the gaze of the eyes and the duration of the gaze in a particular direction. Using this information, it can be inferred whether a user is looking at the display of the electronic device 226, as well as the duration of the eye gaze towards the electronic device.

A viewer 250 is shown with arrows 252a and 252b representing the person's gaze. In order to identify the visual notification, embodiments may analyze a feed from the camera. The presence of the visual notification may be inferred from a determination, based on the analysis, that the viewer's eyes are scanning around an object, inferring that what they are looking for is blocked by such object. Alternatively, or in addition, a determination that users are backing away from the screen, for example, in a direction of arrow 254, may signal that a visual notification is blocking screen output. Additionally, if it is determined that users quickly glance at a screen and then walk away, it is inferred that the device may be out of order, or otherwise rendered unusable by another message/notification on the screen. For example, in the case of a flight status screen at an airport terminal, it may be determined that the average minimum gaze time is ten seconds. Thus, on average, a user looks at the screen for at least ten seconds in order to find their flight information. If the system detects that users are looking at the screen for an average of four seconds, it can be inferred that there is a probability that some other graphic object may be blocking the information that the user wishes to obtain. Thus, embodiments include establishing an average minimum gaze time for a display, and triggering a remediation action upon detecting an average gaze time of users that is below the average minimum gaze time.

Figure 3:
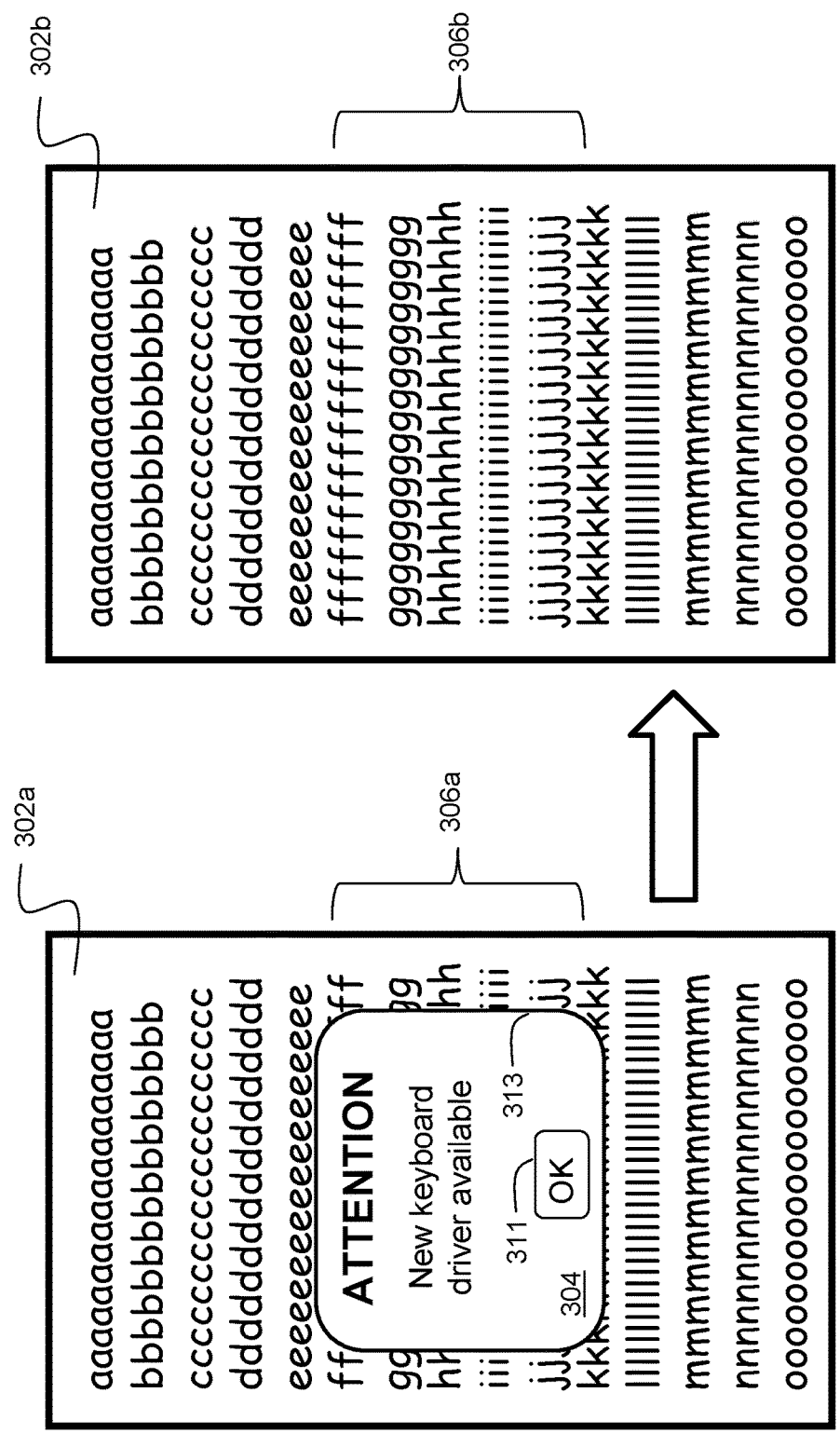
FIG. 3 is an example display device screen having an instance of a notification covering an application's output.

FIG. 3 is an example display device screen having an instance of a notification covering an application's output on the screen at 302a and with the notification removed at 302b. The display device may be a liquid crystal display (LCD), a plasma display, a cathode ray tube (CRT) display, a light emitting diode (LED) display, an organic LED (OLED) display, or other suitable display technology. In the example, the display represents a flight status display screen one would see in an airport.

Display device 302a has visual notification 304 appearing over the messaging on the screen. Notification 304 has contour 313 and covers lines 306a on the screen making such lines unreadable by viewers. In an example scenario, the lines 306a represent flight status information that is output by a flight status screen on a computer with a display mounted several feet above the ground for easy viewing by travelers in an airport. As can be seen in the example of display device 302a, the notification 304 is not germane to the operation of the flight status program. Thus, in this scenario, the flight status program is in operating condition, and properly displaying its output. However, the operating system or other application has posted a notification 304 which is not relevant to the operation of the flight status program, yet it is impeding its use by blocking a portion of the display. In many usage situations, the keyboard and mouse may not even be connected to such a system, and thus, even with human intervention, being able to manually select the OK button 311 to clear the notification can be time consuming. Now, considering a scenario with hundreds of such displays spread out over a large area such as an airport with multiple terminals, it becomes quite impractical to rely on human intervention to monitor and manage each and every display. Embodiments of the present invention provide an automated approach to monitoring and managing these displays, making it possible to maintain a high level of operability, even in a situation with many displays spread out over a large venue such as an airport, mall, or stadium. Upon detecting the existence of such a notification, and/or detecting user behavior that indicates something may be wrong with the display, a remediation action is taken, which results in removal of the notification 304. Display device 302b represents the display device following the remediation, which results in the removal of the notification according to embodiments of the invention, making all lines, including lines 306b, viewable again.

Figure 4:
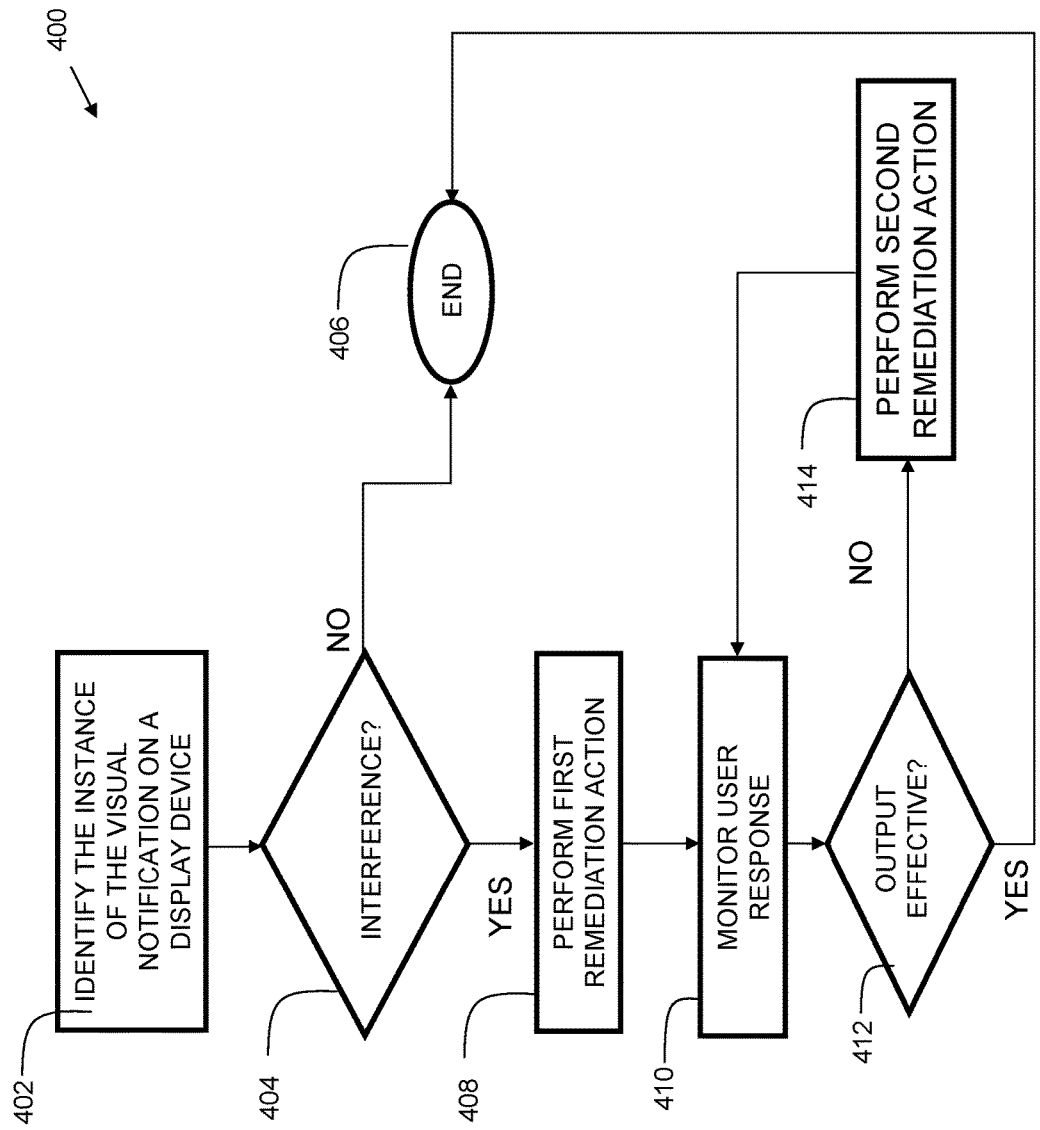
FIG. 4 is a flowchart for embodiments of the present invention.

FIG. 4 is a flowchart 400 for embodiments of the present invention. The instance of the visual notification is identified on a display device, at 402. It is determined whether the visual notification is interfering with the output of the application on the display device, at 404. If not, the process ends, at 406. If yes, a first remediation is performed at 408. In embodiments, the first remediation is a less severe remediation than subsequent remediation processes. For example, a first remediation may include attempting to move and/or clear the interfering notification. Once that remediation action is performed, user response to the output of the application is monitored, at 410. An effectiveness of the output of the application is assessed, based on the monitoring, at 412. If the output is effective, the process ends, at 406. If the output is not effective, a second remediation action is performed, at 414. In embodiments, the second remediation may be more drastic than the first remediation. For example, the second remediation may include killing the process that is displaying the notification, or restarting the display device. While two remediation actions (408 and 414) are shown in FIG. 4, in practice, there can be more or fewer remediation levels. In practice, the process shown in FIG. 4 loops through the remediation levels until the remediation either is successful, or all remediation is exhausted at which point the system will log all relevant information and notify administrators. Examples of multiple remediation levels may include moving progressively from moving the notification to behind the application window that is displaying content, requesting the visual notification window to be closed, requesting the parent application of the visual notification to terminate, forcefully ending the process of the parent application, and lastly, rebooting the entire system.

Additionally, the monitoring (410) is always active, even when there is no detected interference issue with a visual notification. This can serve as a training phase for the system. It allows the system to observe users under normal operating conditions, and thus can be used as a baseline for the system. Referring again to the example of a flight status monitor, the system may track eye gaze and determine that under normal conditions, users view the electronic display for an average of ten seconds. When a visual notification blocks the screen as shown at 302a of FIG. 3, the system may detect an average viewing duration of two seconds. After performing a remediation attempt, if the system still detects an average viewing duration of two seconds, it can be inferred that the remediation was not successful, and another level of remediation can be attempted.

In embodiments, the remediation may include determining the existence of the window by invoking an operating system call to indicate all windows, and indicate if the windows are covering the application of interest. The calls can include a window Z-order API (Application Programming Interface). Such a call may include, for example, the GetTopWindow function in the Microsoft Windows® environment. The remediation may then include using the SetWindowPos API to change the Z-order of the window so that it is behind the application of interest (e.g. a flight status application). Thus, in embodiments, the remediation action comprises removal of the instance of the visual notification.

In other embodiments, the detection of overlapping windows may be done at a graphical level. Embodiments can include collecting a plurality of temporally proximal frame buffers and performing a pattern recognition process on the plurality of temporally proximal frame buffers; and detecting, based on the pattern recognition process, an occurrence of a visual notification contour, of the instance of the visual notification, in at least one of the frame buffers. In embodiments, a frame buffer is acquired at a rate of every 500 milliseconds, and two consecutive acquired frame buffers are considered to be temporally proximal. Referring again to FIG. 3, if a first frame buffer is obtained as shown in 302b, and a second frame buffer is obtained as shown in 302a, then the contour 313 can be detected through pattern recognition techniques, to determine the existence of the notification 304.

In some embodiments, the remediation action may include terminating a parent process of the instance of the visual notification. For example, in Linux environment, this may include invoking an xprop command to determine the process ID (pid) of the window that is to be cleared, and then invoking a kill command for that pid.

In some embodiments, the remediation action may include the remediation action comprises restarting the electronic device. In embodiments, the restarting may be deferred to a time where the number of users determined to be looking at the display (e.g., by analysis of a feed from the camera) falls below a predetermined threshold. A user restart threshold can be established, and the restart of the device can be deferred until the number of users falls below the user restart threshold. For example, if the user restart threshold is set to four, then the restart of the electronic device may be deferred until there are four or fewer users determined to be looking at the display, as detected by the user-facing camera.

In some embodiments, the user restart threshold may be zero. Thus, in embodiments, restarting the electronic device is performed in response to detecting that no users are viewing the electronic device.

As can now be appreciated, embodiments of the present invention provide an improvement in digital signage. In situations with a large number of displays spread out over a large venue, managing the operation of all of the displays can be a challenging task. Embodiments automate this process by monitoring the operating system, application status, and/or user behavior to make a determination if remediation is warranted. Additionally, embodiments provide multiple escalation levels to minimize impact and reduce downtime of the display. With the disclosed embodiments, maintaining a large number of digital signage devices can be more manageable with improved up-time and improved customer experiences.

In additional to digital signage, embodiments of the present invention may be applicable to other use cases, such as in a Network Operations Center (NOC), where there are many display screens that require monitoring. Additionally, embodiments can be used with specialized equipment, such as medical monitors that operate on computing equipment with operating systems to alleviate unrelated messages from interfering with critical functionality of the medical monitoring. Medical personnel, such as nurses and doctors, that are using such equipment, may not possess the technical expertise to acknowledge, process or otherwise restore the system to get it back to a functional state of providing the desired medical information. In such cases, embodiments can detect the visual interference and perform an action, such as automatic notification of a technical support team, and/or providing feedback to the user on how to clear the indication.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for remediating an instance of a visual notification interfering with an output of an application on a display of an electronic device, comprising:
   identifying, by the computer, the instance of the visual notification on the display, wherein the identifying comprises invoking, by the computer, an operating system call to indicate a plurality of windows and a Z-order application programming interface (API);
   determining, by the computer, that the visual notification is interfering with the output of the application on the display;
   performing, by the computer, a first remediation action, wherein the first remediation action comprises attempting to remove the instance of the visual notification, wherein the first remediation action comprises changing a Z-order such that the instance of the visual notification is behind the output of the application on the display;
   monitoring, by the computer, user response to the output of the application;
   assessing, by the computer, based on the monitoring, an effectiveness of the output of the application;
   determining, by the computer, based on the assessing, a failure of the effectiveness of the output of the application; and
   performing, by the computer, a second remediation action in response to the determined failure of effectiveness of the output of the application wherein the second remediation action comprises terminating a parent process of the instance of the visual notification.

2. The computer-implemented method of claim 1, wherein the identifying, by the computer, the instance of the visual notification comprises:
   collecting, by the computer, a plurality of temporally proximal frame buffers;
   performing, by the computer, a pattern recognition process on the plurality of temporally proximal frame buffers; and
   detecting, by the computer, based on the pattern recognition process, an occurrence of a visual notification contour, of the instance of the visual notification, in at least one of the frame buffers.

3. The computer-implemented method of claim 1, wherein the remediation action comprises restarting, by the computer, the electronic device.

4. The computer-implemented method of claim 3, wherein the restarting, by the computer, the electronic device is performed in response to a detection that no users are viewing the electronic device.

5. The computer-implemented method of claim 1, wherein the monitoring, by the computer, comprises determining, by the computer, a duration of an eye gaze of one or more users in a direction of the display.

6. The computer-implemented method of claim 1, wherein the invoking includes a GetTopWindow function in Microsoft Windows® environment, and the first remediation includes using a SetWindowPos API as the Z-order API.

7. A computer system comprising:
   a processor;
   a memory coupled to the processor, the memory containing instructions, that when executed by the processor, perform the steps of:
   identifying an instance of a visual notification on a display of an electronic device, wherein the identifying comprises invoking an operating system call to indicate a plurality of windows and a Z-order application programming interface (API);
   determining that the visual notification is interfering with an output of an application on the display;
   performing a first remediation action, wherein the first remediation action comprises attempting to remove the instance of the visual notification, wherein the first remediation action comprises changing a Z-order such that the instance of the visual notification is behind the output of the application on the display;
   monitoring user response to the output of the application;
   assessing, based on the monitoring, an effectiveness of the output of the application;
   determining, based on the assessment, a failure of the effectiveness of the output of the application; and
   performing a second remediation action in response to the determined failure of effectiveness of the output of the application wherein the second remediation action comprises terminating a parent process of the instance of the visual notification.

8. The system of claim 7, wherein the identifying the instance of the visual notification comprises:
   collecting a plurality of temporally proximal frame buffers;
   performing a pattern recognition process on the plurality of temporally proximal frame buffers; and
   detecting, based on the pattern recognition process, an occurrence of a visual notification contour, of the instance of the visual notification, in at least one of the frame buffers.

9. The system of claim 7, wherein the monitoring comprises determining a duration of an eye gaze of one or more users in a direction of the display.

10. The system of claim 7, wherein the invoking includes a GetTopWindow function in Microsoft Windows® environment, and the first remediation includes using a SetWindowPos API as the Z-order API.

11. A computer program product in a computing device comprising a computer readable storage medium having program instructions embodied therewith, the program instructions executable by a processor to cause the computing device to:
   identify an instance of a visual notification on a display device identifying, by the computer, the instance of the visual notification on the display, wherein the identifying comprises invoking an operating system call to indicate a plurality of windows and a Z-order application programming interface (API);
   determine that the visual notification is interfering with an output of an application on the display device;
   perform a first remediation action, wherein the first remediation action comprises attempting to remove the instance of the visual notification, wherein the first remediation action comprises changing a Z-order such that the instance of the visual notification is behind the output of the application on the display;
   monitor user response to the output of the application;
   assess, based on the monitoring, an effectiveness of the output of the application;
   determine, based on the assessment, a failure of the effectiveness of the output of the application; and perform a second remediation action in response to the determined failure of effectiveness of the output of the application wherein the second remediation action comprises terminating a parent process of the instance of the visual notification.

12. The computer program product of claim 11, wherein the identifying the instance of the visual notification comprises:
- collecting a plurality of temporally proximal frame buffers;
- performing a pattern recognition process on the plurality of temporally proximal frame buffers; and
- detecting, based on the pattern recognition process, an occurrence of a visual notification contour, of the instance of the visual notification, in at least one of the frame buffers.

13. The computer program product of claim 11, wherein the remediation action comprises restarting the computing device in response to a detection that no users are viewing the display device.

14. The computer program product of claim 11, wherein the monitoring comprises determining a duration of an eye gaze of one or more users in a direction of the display device.

15. The computer program product of claim 11, wherein the invoking includes a GetTopWindow function in Microsoft Windows® environment, and the first remediation includes using a SetWindowPos API as the Z-order API.

* * * * *